United States Patent
Panambur et al.

(10) Patent No.: US 12,405,780 B2
(45) Date of Patent: Sep. 2, 2025

(54) FIRMWARE UPDATES USING A FIRST CORE SYSTEM AND A BACKUP CORE SYSTEM

(71) Applicant: Hewlett Packard Enterprise Development LP, Spring, TX (US)

(72) Inventors: Deepak Panambur, Karnataka (IN); Pavan Sridhar Murthy, Karnataka (IN); Syama Sundararao Nadiminti, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 99 days.

(21) Appl. No.: 18/066,189

(22) Filed: Dec. 14, 2022

(65) Prior Publication Data
US 2024/0118881 A1    Apr. 11, 2024

(30) Foreign Application Priority Data
Oct. 10, 2022    (IN) .............................. 202241057863

(51) Int. Cl.
*G06F 8/65*    (2018.01)
(52) U.S. Cl.
CPC ..................... *G06F 8/65* (2013.01)
(58) Field of Classification Search
CPC ............... G06F 8/65; G06F 9/44; H04L 29/08
USPC ................................................ 717/168–173
See application file for complete search history.

(56) References Cited

U.S. PATENT DOCUMENTS

| | | | | |
|---|---|---|---|---|
| 8,285,846 B2 * | 10/2012 | Pyhalammi | ......... | G06F 9/44536 717/124 |
| 8,495,618 B1 | 7/2013 | Inbaraj et al. | | |
| 8,707,297 B2 * | 4/2014 | Brown | ...................... | G06F 8/65 717/178 |
| 10,693,951 B2 * | 6/2020 | Jujjuri | ................. | H04L 67/1008 |
| 11,334,416 B2 * | 5/2022 | Butcher | .............. | G06F 11/3037 |
| 2007/0180314 A1 * | 8/2007 | Kawashima | ........ | G06F 11/2046 714/15 |

(Continued)

OTHER PUBLICATIONS

HPE, "HPE iLO Federation User Guide for iLO 5", available online at <https://support.hpe.com/hpesc/public/docDisplay?docId=a00018325en_us>, 2022, 1 page.

(Continued)

*Primary Examiner* — Qing Chen
(74) *Attorney, Agent, or Firm* — Trop, Pruner & Hu, P.C.

(57) ABSTRACT

Some examples relate to firmware updates. In an example, a first core system determines firmware updates to be installed on the first core system and auxiliary systems of a data center. The first core system sends firmware update package generation instructions to a cloud infrastructure comprising data center firmware updates. The first core system downloads a firmware update package from the cloud infrastructure. The first core system updates firmware of the first core system, based on one or more firmware updates in the firmware update package. The first core system receives a request for a specific firmware update from an auxiliary system. Based on the request received from the auxiliary system, the first core system identifies the specific firmware update for the auxiliary system from the firmware update package. The first core system provides the specific firmware update to the auxiliary system.

15 Claims, 5 Drawing Sheets

(56) References Cited

U.S. PATENT DOCUMENTS

2011/0106886 A1  5/2011 Nolterieke et al.
2011/0314462 A1* 12/2011 Clark .................. G06F 8/65
                                                717/169
2021/0124592 A1*  4/2021 Yu .................... G06F 8/658

OTHER PUBLICATIONS

Santhosh et al., "Automatic/Scalable Firmware and System Software update on Datacenter Products like Server, Storage and Network devices", Technical Disclosure Commons, Jul. 11, 2017, 6 pages.

* cited by examiner

FIRMWARE UPDATES USING A FIRST CORE SYSTEM AND A BACKUP CORE SYSTEM

BACKGROUND

A data center may include a few to hundreds of computers (e.g., servers). Some of these computers may be connected to a cloud infrastructure (referred to as cloud connected computers) while others may not be connected (referred to as non-connected computers). Regular firmware updates of data center computers (both cloud connected and non-connected) are desirable for various reasons such as security, performance, or resource efficiency.

BRIEF DESCRIPTION OF THE DRAWINGS

For a better understanding of the solution, examples will now be described, with reference to the accompanying drawings, in which.

DETAILED DESCRIPTION

Figure 1:
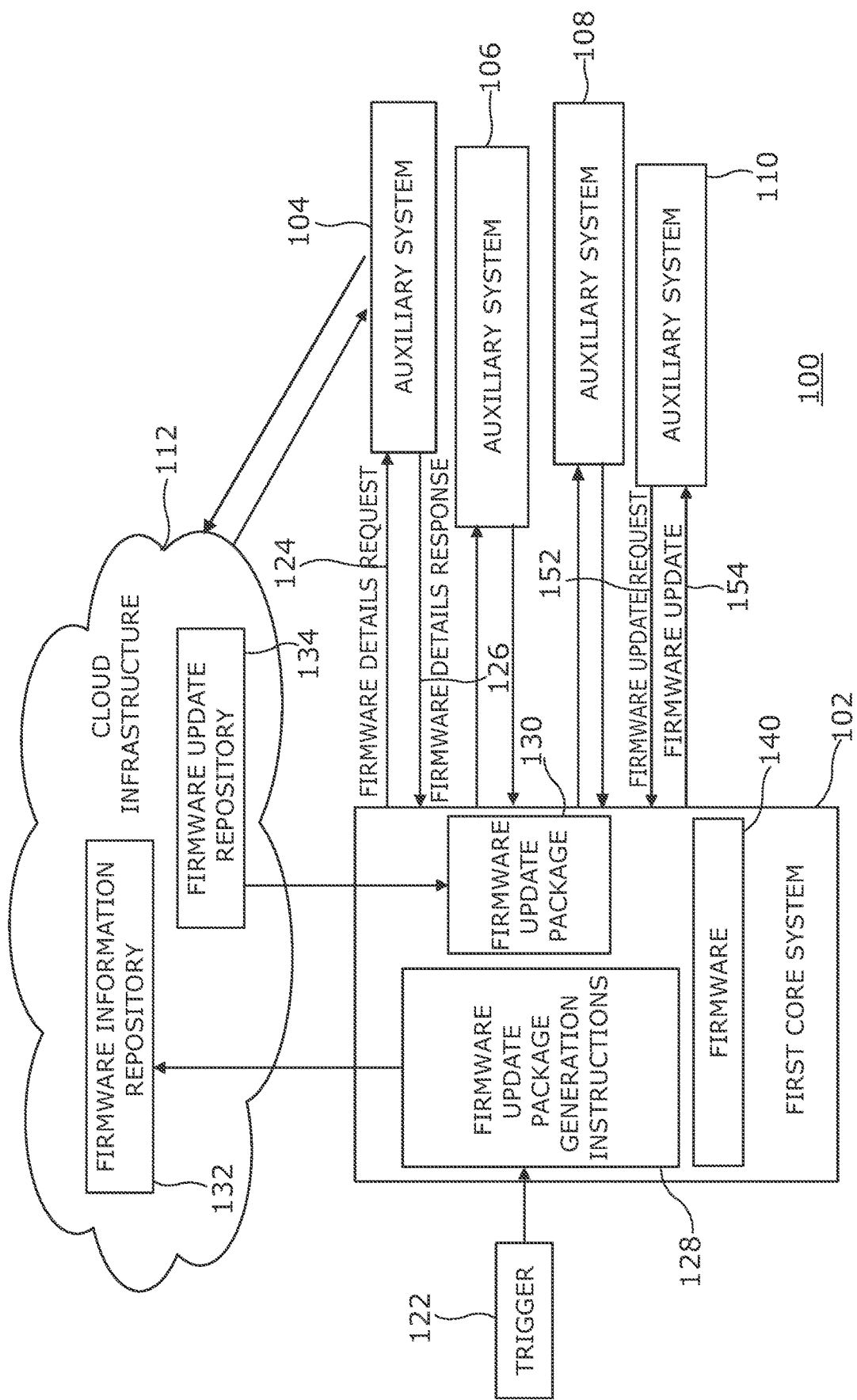
FIG. 1 is a block diagram of a computing environment for providing firmware updates in a data center, according to some examples.

It may be desirable to regularly update the firmware of data center computers to improve the functionality (e.g., resource utilization) and features (e.g., security or bug fixing) of a device. In a current approach, a system administrator may manually perform this activity. In another current approach, specific management software or console may be used. These processes could be construed as cumbersome, complex, costly, and time-consuming. For instance, it would be very onerous to manually perform such activity for each computer in a data center, especially in a large data center that may include hundreds of data center computers. Likewise, performing such activity via a tool (e.g., a management software) may require investment in skill and time in learning the tool, apart from the time, effort, and costs involved in creating or acquiring the tool.

Further, cloud connected computers in a data center may use a cloud infrastructure to download firmware updates. If each cloud connected computer downloads a firmware update package separately, it leads to repeated downloads of the same content and results in wasting network resources. It also delays the update process due to network bandwidth limitations.

Furthermore, non-cloud connected computers in a data center may pose an additional challenge while providing firmware updates since some of these computers (e.g., computer servers on an oil rig) may not be connected to a cloud infrastructure (e.g., of an offshore data center) at all times, for security or other reasons.

Additionally, all data center computers should not be expected to download an entire firmware update package for a delta update. Considering that some firmware update packages with hundreds of components may be very large (e.g., multiple gigabytes), downloading an entire firmware package for a delta update may be inefficient from an installation perspective. (As used herein, a "delta update" is an update that only includes the code that has changed, not the whole program.)

The proposed solution addresses these technical challenges via a core system that analyzes firmware update requirements of auxiliary systems (both cloud connected and non-cloud connected computers) in a data center. The core system instructs a cloud infrastructure to generate a comprehensive firmware update package based on the analysis. In some implementations, the core system obtains the firmware update package from the cloud infrastructure and provides auxiliary systems (both cloud connected and non-connected computers) with their respective firmware updates. In this manner, all computers in the data center get updated with the relevant firmware.

The proposed solution doesn't require a manual update of data center computers. It thus reduces the load on the system administrators. The proposed solution also does not need a specific management software or console to perform this activity. It thereby reduces associated costs (e.g., software and/or hardware cost or personnel training cost) to perform firmware updates in a data center.

The proposed solution doesn't require each cloud connected auxiliary system to download a firmware update package separately. It preempts a direct network connection between an auxiliary system and the cloud infrastructure just to download a firmware update. The proposed solution helps save precious network resources (e.g., network bandwidth or processor utilization).

Furthermore, in some implementations, the core system obtains the firmware update package from the cloud infrastructure and provides each non-cloud connected auxiliary system with its respective firmware update. In this manner, all non-cloud connected auxiliary systems in the data center get updated with the relevant firmware. The proposed solution doesn't require a non-cloud connected auxiliary system to obtain a firmware update package separately. It helps maintain the organizational logic (e.g., security) across the non-cloud connected auxiliary systems in a data center as well.

Additionally, in some implementations, the core system obtains the delta updates from the cloud infrastructure and provides them to the respective auxiliary system, as applicable. The proposed solution doesn't require each auxiliary system in the data center to download an entire firmware update package just for a delta update. It helps save precious network resources (e.g., network bandwidth and processor utilization).

Referring now to the figures, FIG. 1 is a block diagram of an example computing environment 100 that includes include a first core system 102, auxiliary systems 104, 106, 108, and 110, and a cloud infrastructure 112.

As used herein, a "core system" refers to a computer of a data center that is used to download a firmware update package from a cloud infrastructure. Examples of the core system (e.g., "first core system 102) may include, without limitation, a server, a desktop computer, a notebook computer, a tablet computer, a thin client, or any other processing device.

As used herein, a "data center" refers to a building, a dedicated space within a building, or a group of buildings used to house computers and associated components, such as telecommunications and storage devices.

As used herein, "firmware" is a specific class of computer software that provides low-level control for a device's specific hardware. Examples of devices containing firmware are embedded systems (running embedded software), home and personal-use appliances, computers, computer peripherals, or any other processing device.

As used herein, the term "firmware update" may refer to a new version of firmware or any other suitable code that is executed to perform desired functionalities. Installation of a firmware update on a hardware resource, as used herein, may mean that a new version of firmware may be installed on the component of the hardware resource.

As used herein, the term "package" refers to written programs, procedures or rules, and associated documentation about the operation of a computer that is stored in a read/write memory.

As used herein, a "cloud infrastructure" refers to on-demand network access to a shared pool of information technology resources (e.g., networks, servers, storage, and/or applications) that can be provisioned without direct active management by a user. Examples of a cloud infrastructure may include a public cloud, a private cloud, or a hybrid cloud. A cloud infrastructure may be termed a public cloud if information technology resources are rendered over a public network such as the internet. On the other hand, in a private cloud information technology resources are rendered over a private network to a specific set of users. A hybrid cloud is a cloud computing service model that provides cloud computing solutions by combining different cloud service models such as private and public clouds. For example, the cloud infrastructure may distribute firmware updates for a computer (e.g., first core system or auxiliary system).

As used herein, the term "auxiliary system" refers to a computer of a data center that is communicatively coupled to a core system. Examples of an auxiliary system may include, without limitation, a server, a desktop computer, a notebook computer, a tablet computer, a thin client, or any other processing device.

An auxiliary system may include a cloud connected computer (i.e. connected to a cloud infrastructure (e.g., 112)) or a non-cloud connected computer (i.e. not connected to a cloud infrastructure (e.g., 112)). For example, referring to FIG. 1, auxiliary system 104 is connected to the cloud infrastructure 112 and auxiliary systems 106, 108, and 110 are not connected to the cloud infrastructure 112.

Although four auxiliary systems 104, 106, 108, and 110 are depicted in FIG. 1, in some examples, computing environment 100 may include a different number of auxiliary systems.

The first core system 102 and the auxiliary systems 104, 106, 108, and 110 can be part of a data center. In some cases, the first core system 102, and the auxiliary systems 104, 106, 108, and 110 can be present in different geographical locations.

In some examples, the first core system 102 is a cloud connected computer (i.e. connected to a cloud infrastructure (e.g., 112)).

As shown in FIG. 1, a trigger 122 can cause the first core system 102 to determine firmware updates to be installed on the first core system 102 and the auxiliary systems 104, 106, 108, and 110. In some examples, the trigger 122 can be a user request directly given to the first core system 102. In some other examples, the trigger 122 can be a user request that is provided over a network such as a local area network (LAN), wide area network (WAN), a storage area network (SAN), a campus area network (CAN), or any other type of network.

In other examples, the trigger 122 can be the addition of a new auxiliary system to the computing environment 100. As used herein, a "new" auxiliary system can comprise a computer (e.g., a server, a desktop computer, a notebook computer, a tablet computer, a thin client, or any other processing device) with at least one of new hardware, new software, or new firmware. It can also comprise a computer with dated software or dated firmware. As used herein, the term "dated" refers to a period prior to a specified date or time. In the context of software or firmware, the term "dated" refers to include a version of software or firmware released (e.g., by a hardware/software producer) prior to a specified date (e.g., Jan. 1, 2020) or time (e.g., 10 AM).

In response to trigger 122, the first core system 102 determines firmware updates to be installed on the first core system 102 and the auxiliary systems 104, 106, 108, and 110. In some examples, the first core system 102 may send a communication message 124 requesting device firmware details to the respective auxiliary systems 104, 106, 108, and 110. As used herein, "device firmware details" can refer to the firmware version, firmware build number, or firmware build date of a hardware device(s) (for example, motherboard, processor, graphics processor, hard drive, mouse, or any other device), which is part of or coupled to a system (e.g., first core system or an auxiliary system).

A "firmware version number" can refer to a specific identifier that identifies what firmware a device is running. A "firmware build number" can refer to a specific identifier that identifies a specific result or artifact of a particular build. A "firmware build date" can refer to a specific identifier that identifies a date and/or time when the firmware was updated last.

In response to the communication message 124, the first core system 102 may receive a response message 126 including device firmware details from respective auxiliary systems 104, 106, 108, and 110.

The first core system 102 identifies its device firmware details and collates those details with the device firmware details received from respective auxiliary systems 104, 106, 108, and 110. In some examples, the first core system 102 identifies the device firmware details by generating a report of the current version of firmware installed on the first core system 102. Each of the auxiliary systems 104, 106, 108, and 110 generate a similar report as well, which is provided to the first core system 102. The first core system 102 compiles the collated firmware details into firmware update package generation instructions 128. In some examples, the first core system 102 complies the collated firmware details by consolidating the individual reports into a single report that includes an inventory list of firmware on the first core system 102 and auxiliary systems 104, 106, 108, and 110.

The first core system sends 102 the firmware update package generation instructions 128 to the cloud infrastructure 112. The firmware update package generation instructions may include, for example, device firmware details of the first core system 102 and auxiliary systems 104, 106, 108, and 110 along with instructions for a processor in the cloud infrastructure 112 to compare the device firmware details in the firmware update package generation instructions 128 with the latest device firmware details in the firmware information repository 132.

In some examples, the first core system 102 communicates with the cloud infrastructure (including sending the firmware update package generation instructions 128) 112 via an authentication mechanism, for example, a mutual authentication mechanism such as certificates based on Mutual Transport Layer Security (mTLS). As used herein, "mutual TLS" (mTLS) is a method for mutual authentication. mTLS ensures that the parties at each end of a network connection are who they claim to be by verifying that they both have the correct private key.

In some examples, based on the firmware update package generation instructions, the cloud infrastructure 112 identifies one or more firmware updates for the first core system 102 and the respective auxiliary systems 104, 106, 108, and 110. The cloud infrastructure 112 maintains a firmware information repository 132 that comprises the latest device firmware details of the first core system 102 and the auxiliary systems 104, 106, 108, and 110. In some examples, the cloud infrastructure 112 performs the identification by comparing the device firmware details in the firmware update package generation instructions 128 with the latest device firmware details in the firmware information repository 132.

In response to the comparison, the cloud infrastructure 112 identifies one or more firmware updates for the first core system 102 and the respective auxiliary systems 104, 106, 108, and 110. The cloud infrastructure 112 maintains a firmware update repository 134 that comprises firmware updates for the first core system 102 and the auxiliary systems 104, 106, 108, and 110. In some examples, the cloud infrastructure 112 identifies one or more firmware updates for the first core system 102 and the respective auxiliary systems 104, 106, 108, and 110 from the firmware update repository 134.

In some cases, the firmware information repository 132 and the firmware update repository 134 may be combined.

The cloud infrastructure 112 generates a firmware update package 130 comprising one or more firmware updates for the first core system 102 and the respective auxiliary systems 104, 106, 108, and 110. The cloud infrastructure 112 extracts the firmware updates for the first core system 102 and the respective auxiliary systems 104, 106, 108, and 110 from the firmware update repository 134. The firmware update repository 134 may include firmware updates for a number of systems (not illustrated) including firmware updates for the first core system 102 and the auxiliary systems 104, 106, 108, and 110. The cloud infrastructure may extract the firmware updates relevant to the first core system 102 and the auxiliary systems 104, 106, 108, and 110. The cloud infrastructure may bundle them into the firmware update package 130. As used herein, a bundle refers to an all-inclusive package of firmware updates in an archive, for example, a rar zip, or any other archive file.

In some examples, after the firmware update package 130 is created, the cloud infrastructure 112 sends an update message informing the generation of the firmware update package 130 to the first core system 102.

In response to receiving the update message, the first core system 102, downloads the firmware update package 130 from the cloud infrastructure 112. In some examples, the first core system 102 communicates with the cloud infrastructure (including receiving the update message and downloading the firmware update package) 112 via an authentication mechanism, for example, a mutual authentication mechanism such as certificates-based on mTLS.

In some examples, the first core system 102 updates its own firmware 140, based on the firmware updates in the firmware update package 130. The first core system 102 identifies its firmware updates from the firmware update package 130, based on a device identifier. Consequent to such identification, the first core system 102 extracts the relevant firmware updates and updates its firmware 140.

The firmware update package 130 may include firmware updates for a number of systems (e.g., the first core system 102 or an auxiliary system(s)). In some examples, the firmware updates for those systems may occur in any order i.e. without a priority. In other examples, a priority order for updating such systems could be defined. For example, updating the first core system 102 prior to an auxiliary system could be one priority order.

In some examples, the first core system 102 receives a request 152 for a specific firmware update(s) from an auxiliary system (e.g., auxiliary system 110). In some examples, the auxiliary system 110 making the request is a cloud connected computer that is connected to the cloud infrastructure 112. In some cases, the auxiliary system 110 is a non-cloud connected computer that is not connected to the cloud infrastructure 112.

In some examples, the specific firmware update(s) include a delta update. As used herein, a "delta update" is an update that includes the code that has changed (e.g., a partial update), not the whole program.

In some examples, the first core system 102 communicates with the auxiliary system (including receiving the request for the specific firmware update(s)) 110 via certificates based on mTLS.

In response, based on the request 152 received from the auxiliary system 110, the first core system 102, identifies the specific firmware update(s) for the auxiliary system 110 from the firmware update package 130 The request may include, for example, a device identifier of the auxiliary system 110 along with details related to the firmware or hardware whose update is requested. The device identifier is used to identify the auxiliary system 110. The details related to the firmware or hardware (for example, processor, graphics processor, hard drive, mouse, or any other device) may include firmware version, firmware build number, or other related details. Consequent to such identification, the first core system 102 extracts the specific firmware update(s) from the firmware update package 130. The firmware update package 130 may include firmware updates for a number of auxiliary systems including firmware updates for the auxiliary system 110. The first core system 102 extracts the firmware updates from the firmware update package 130 based on the information (e.g., device identifier, firmware version, firmware build number, or other related details) in the request 152 received from the auxiliary system 110.

The first core system 102 then provides the specific firmware update(s) 154 to the auxiliary system 110. In some examples, the first core system 102 provides the specific firmware update(s) 154 via an authentication mechanism, for example, a mutual authentication mechanism such as certificates based on mTLS.

On receipt of the specific firmware update 154, the auxiliary system 110 can update its firmware. In this manner, even if the auxiliary system 110 is a cloud connected computer, the auxiliary system 110 does not use a network connection to download a firmware update package separately. The first core system 102 manages that task for the auxiliary system 110 as explained above. The auxiliary system 110 refrains from using a network connection to download a firmware update, in response to receiving firmware updates (e.g., 154) from the first core system 102. If the receipt is incomplete (e.g., due to a failed network connection), the first core system again sends the firmware update 154 to the auxiliary system 110. This helps save network resources (e.g., network bandwidth or processor utilization).

On the other hand, if the auxiliary system 110 is a non-cloud connected computer, the first core system 102 obtains the firmware update package 130 from the cloud infrastructure 112 and provides the auxiliary system 110 with its specific firmware update 154. A non-cloud connected auxiliary system thus does not depend on a network connection to download a firmware update package. The first core system 102 manages that task for the auxiliary system 110 as explained above. This helps maintain the organizational logic (e.g., security) on a non-cloud connected auxiliary system in a data center.

In some examples, if the auxiliary system 110 requests a delta update, the first core system 102 provides the delta update to the auxiliary system 110. Thus, the auxiliary system receives the delta update rather than the entire firmware update package 130. The auxiliary system 110 controls whether it wants to request for an entire firmware update or a delta update from the first core system 102. In the event the receipt of a firmware update (e.g., an entire firmware update or a delta update) is incomplete (e.g., due to a failed network connection), the first core system again sends the firmware update to the auxiliary system 110. In the event two identical auxiliary systems (e.g., similar sever configuration) request for different firmware updates, the respective device identifiers of the auxiliary systems (included in the firmware update requests) can be used by the first core system 102 to differentiate between the two auxiliary systems and provide separate firmware updates.

Figure 2:
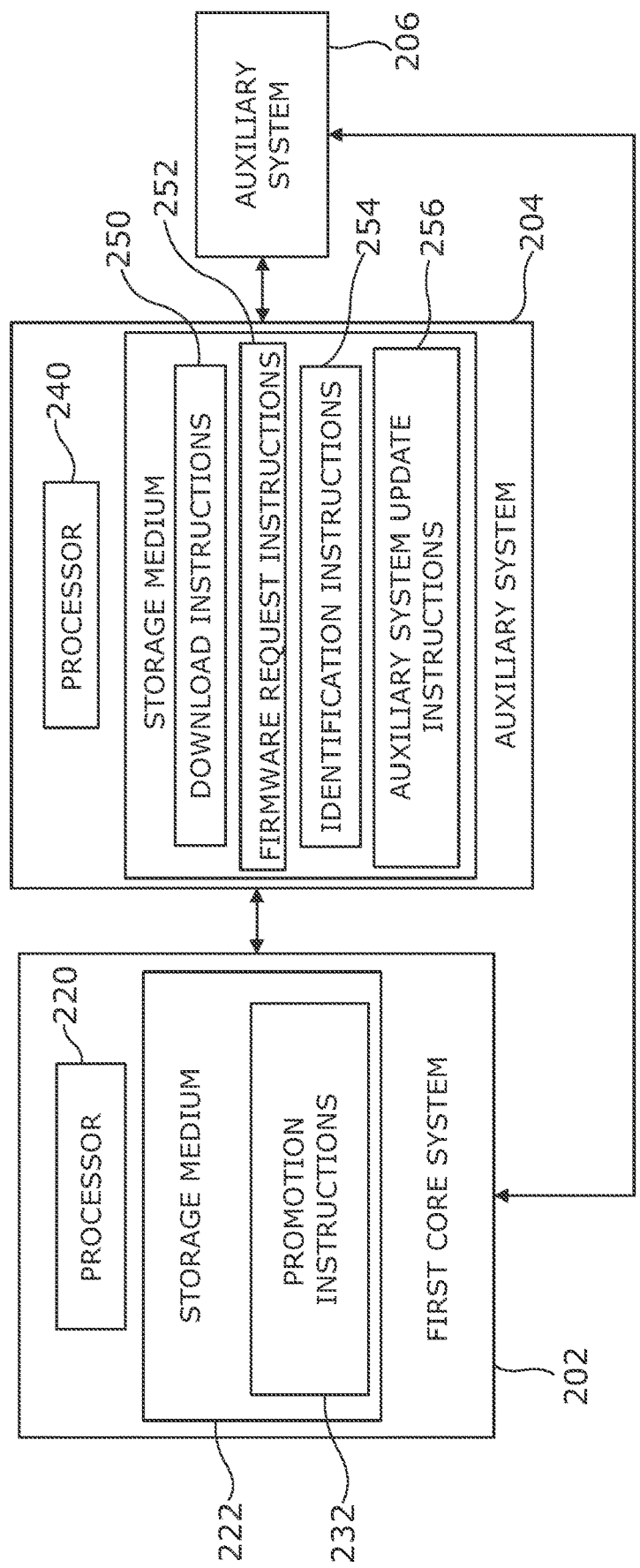
FIG. 2 illustrates a core system and auxiliary systems of the computing environment, according to some examples.

FIG. 2 illustrates an example of a first core system and auxiliary systems of the computing environment of FIG. 1.

The first core system 202 can include a processor 220 (or multiple processors) and a storage medium 222.

The processor 220 can include a Central Processing Unit (CPU), a microprocessor, a programmable gate array, a microcontroller, or any other processing logic that interprets and executes machine-readable instructions stored in storage medium 222.

The storage medium 222 can store information and machine-readable instructions executable on the processor 220 to perform various tasks. The storage medium 222 can be Synchronous DRAM (SDRAM), Double Data Rate (DDR), Rambus DRAM (RDRAM), Rambus RAM, etc., or storage memory media such as a floppy disk, a hard disk, a CD-ROM, a DVD, a pen drive, and the like.

In some examples, the first core system 202 may become unavailable, for example, due to loss of power, maintenance, a bug, or a network connection issue. In advance of such a scenario, processor 220 on the first core system 202 may execute machine-readable promotion instructions 232 to select an auxiliary system as a "second core system". Promotion instructions 232 are used to select a backup core system (e.g., a second core system) in the computing environment, in the event the first core system 202 becomes unavailable. Promotion instructions 232 are used to ensure that at least one core system is always available in the computing environment. In response to the selection, the second core system can download a firmware update package from a cloud infrastructure, similar to the manner described in connection with FIG. 1.

The first core system 202 may preemptively (i.e. before the first core system 202 becomes unavailable) select an auxiliary system as the second core system based on a criterion (or criteria) described below. In some examples, in the event the first core system fails to preemptively select an auxiliary system as the second core system, a user could select one of the auxiliary systems as the second core system based on a criterion (or criteria) described below.

In some examples, the processor 220 executes promotion instructions 232 to determine network bandwidth consumption of a lights out mechanism, for example, an Integrated Lights-Out (ILO) on respective auxiliary systems 204 and 206. As used herein, "lights out mechanism" (or iLO) is a server management technology that enables out-of-band control and management of a server from a remote location. iLO makes it possible to perform activities on a server from a remote location. The iLO card has a separate network connection (and its own IP address) to which one can connect via Hypertext Transfer Protocol Secure (HTTPS). iLO can be used to reset a server, power up the server, or access the server's Integrated Management Log (IML). These activities can affect network bandwidth consumption on a computer such as an auxiliary system.

The processor 220 executes promotion instructions 232 to select an auxiliary system (e.g., 204) that has an ILO with network bandwidth consumption lower than a pre-defined value (e.g., an "x" numeric value), for example, defined by a user, derived by the first core system 202, or determined by or received from another device.

In some examples, in case more than one auxiliary system meets the criterion, the processor 220 executes promotion instructions 232 to select any of those auxiliary systems as the second core system, based on a priority, at random, or any other specified criteria. In further examples, in case more than one auxiliary system meets the criterion, the processor executes promotion instructions 232 to select an auxiliary system as the second core system, based on an additional criterion described below. In case more than one auxiliary system meets a given criterion, an additional criterion may be used to select a second core system.

In some examples, the processor 220 executes promotion instructions 232 to determine the number of pending firmware updates on respective auxiliary systems 204 and 206. Each auxiliary system may have a certain number of pending firmware updates. The processor 220 executes promotion instructions 232 to determine that number for respective auxiliary systems (e.g., 204 and 206) and select an auxiliary system (e.g., 204) as the second core system that has more pending firmware updates than a pre-defined value (e.g., an "x" numeric value), for example, defined by a user, derived by the first core system 202, or determined by or received from another device.

A selection based on the aforesaid determination is one example of the additional criterion.

In some examples, the processor 220 executes promotion instructions 232 to determine available storage space on respective auxiliary systems 204 and 206. Each auxiliary system may have a certain amount of available storage space (e.g., read-only memory (ROM), flash memory, or magnetic storage devices (e.g., hard disks)). The processor 220 executes promotion instructions 232 to determine available storage space on respective auxiliary systems (204 and 206) and select an auxiliary system (e.g., 204) as the second core system that has available storage space more than a pre-defined value (e.g., an "x" numeric value), for example, defined by a user, derived by the first core system 202, or determined by or received from another device. A selection based on the aforesaid determination is another example of the additional criterion.

In some examples, the processor 220 executes promotion instructions 232 to determine a prior firmware download success rate of respective auxiliary systems 204 and 206. As used herein, a "prior firmware download success rate" refers to a success rate, in metric terms (e.g., percentage), of an auxiliary system in downloading a firmware update from a cloud infrastructure. The processor 220 executes promotion instructions 232 to determine a prior firmware download success rate of respective auxiliary systems (204 and 206) and select an auxiliary system (e.g., 204) as the second core system that has a prior firmware download success rate higher than a pre-defined value (e.g., an "x" numeric value), for example, defined by a user, derived by the first core system 202, or determined by or received from another device. A selection based on the aforesaid determination is yet another example of the additional criterion.

In an example, based on one or more criteria described above, auxiliary system 204 can be selected as the second core system. In some examples, a criterion could be selected in any order i.e. without a priority. In other examples, a priority order for selecting a criterion could be defined, for example, by a user, derived by the first core system 202, or determined by or received from another device. For example: a) iLO with network bandwidth consumption, b) number of pending firmware updates on respective auxiliary systems, c) available storage and d) a prior firmware download success rate space on respective auxiliary systems could be one priority order.

The second core system 204 can include a processor 240 (similar to processor 220) and a storage medium 242 (similar to storage medium 222).

In some examples, if the first core system 202 becomes unavailable, the processor 240 on the second core system 204 executes download instructions 250 to download a firmware update package from a cloud infrastructure similar to the cloud infrastructure 112 of FIG. 1.

In some examples, the second core system 204 can communicate with the cloud infrastructure (including downloading the firmware update package) in a manner described above in relation to the first core system 202.

In some examples, the processor 240 on the second core system 204 executes firmware request instructions 252 to receive a request for a specific firmware update(s) from an auxiliary system (e.g., auxiliary system 206). In some examples, the auxiliary system 206 making the request is a cloud connected computer. In some cases, the auxiliary system is a non-cloud connected computer.

In response to the request received from the auxiliary system 206, the processor 240 on the second core system 204 executes identification instructions 254 to identify the specific firmware update(s) for the auxiliary system 206 from the firmware update package, based on a device identifier. The request may include, for example, a device identifier of the auxiliary system 206 along with details related to the firmware or hardware whose update is requested. The device identifier is used to identify the auxiliary system 206. The details related to the firmware or hardware (for example, processor, graphics processor, hard drive, mouse, or any other device) may include firmware version, firmware build number, or other related details. Consequent to such identification, instructions 254 are further executed to extract the specific firmware update(s) from the firmware update package. The firmware update package may include firmware updates for a number of auxiliary systems including firmware updates for the auxiliary system 206. Instructions 254 are executed to extract the firmware updates from the firmware update package based on the information (e.g., device identifier, firmware version, firmware build number, or other related details) in the request received from the auxiliary system 206.

The processor 240 on the second core system 204 executes auxiliary system update instructions 256 to provide the specific firmware update(s) to the auxiliary system 206, for example, through certificates based on mTLS.

In some examples, processor 240 can load the instructions 250, 252, 254, and 256 to a Baseboard Management Controller (BMC) and execute the instructions from the BMC. As used herein, a "Baseboard Management Controller" (BMC) is a service processor which is capable of monitoring the physical state of a hardware device (e.g., a computer server) with the help of sensors.

In some examples, the processor 240 can load the instructions 250, 252, 254, and 256 to an operating system and execute the instructions from the operating system.

Figure 3:
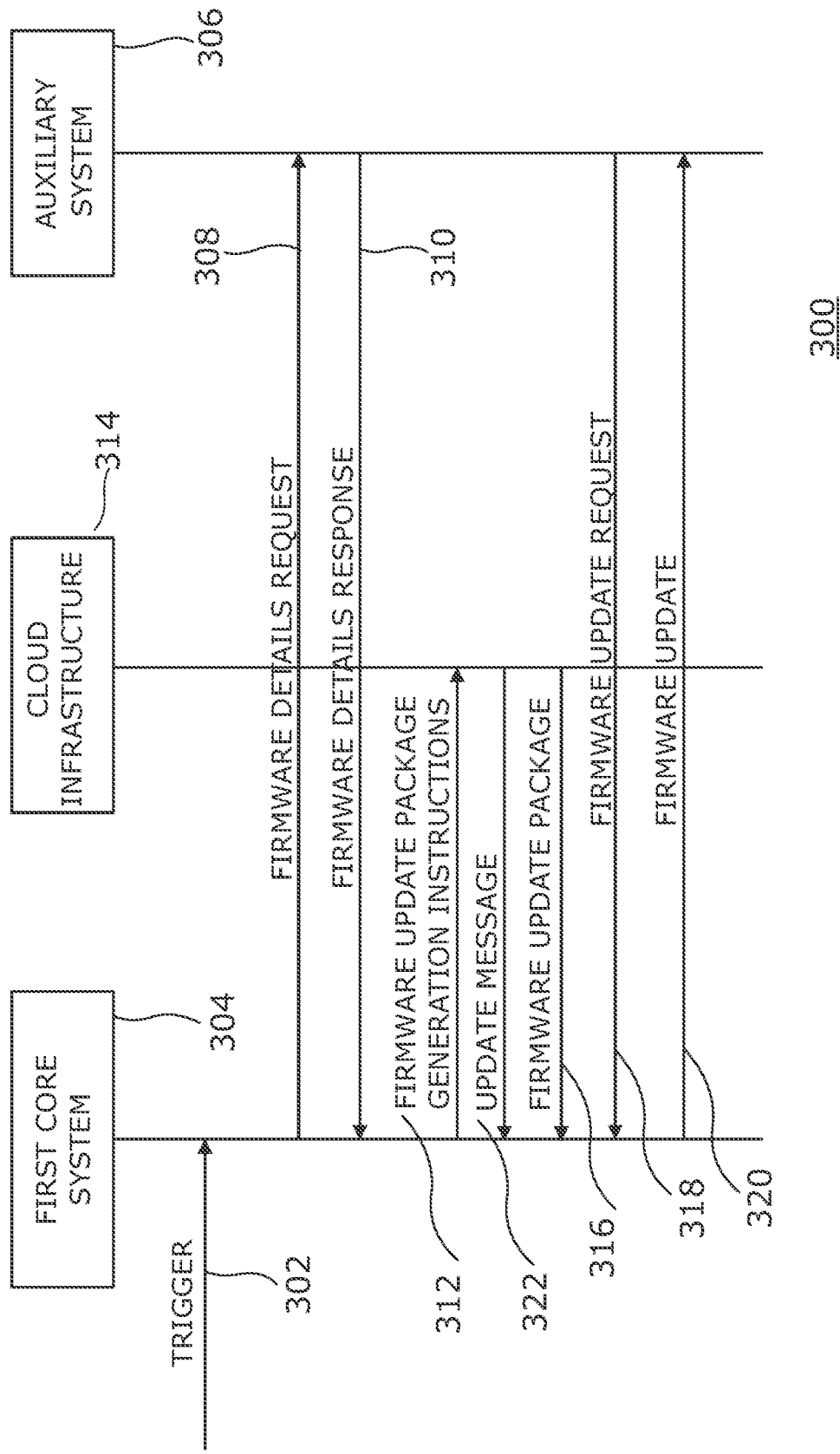
FIG. 3 is a block diagram of a communication flow for updating firmware in a data center, according to some examples.

FIG. 3 is a block diagram of a communication flow 300, according to some examples.

In FIG. 3, in response to a trigger 302, a first core system 304 determines firmware updates to be installed on the first core system 304 and an auxiliary system 306 of a data center. As used herein, the term "trigger" refers to an act, message or request that sets in motion some course of events. In some examples, the trigger 302 can be a user request, which could be directly given to the first core system 304 or over a network such as a LAN, WAN, or any other type of network. In some examples, the first core system 304 sends a communication message 308 requesting device firmware details to the auxiliary system 306.

In response to the communication message, the first core system 304 may receive a response message 310 including device firmware details from the auxiliary system.

The first core system 304 identifies its device firmware details and collates those details with the device firmware details received from the auxiliary system 306. In some examples, the first core system 304 identifies the device firmware details by generating a report of the current version of firmware installed on the first core system 304. The auxiliary system 306 generates a similar report as well, which is provided to the first core system 304. The first core system 304 collates details from both reports.

The first core system 304 compiles the collated firmware details into firmware update package generation instructions 312. The first core system 304 compiles the collated firmware details into firmware update package generation instructions 312. In some examples, the first core system 304 complies the collated firmware details by consolidating the individual reports into a single report that includes an inventory list of firmware on the first core system 304 and the auxiliary system 306.

The first core system 304 sends the firmware update package generation instructions 312 to a cloud infrastructure (e.g., 314) wherein the firmware package generation instructions include current firmware details of firmware on the first core system 304 and the auxiliary system 306 along with instructions to identify one or more firmware updates for the first core system 304 and the auxiliary system 306.

In some examples, based on the firmware update package generation instructions, the cloud infrastructure identifies one or more firmware updates for the first core system 304 and the auxiliary system 306. The cloud infrastructure maintains a firmware information repository that comprises the latest device firmware details of the first core system 304 and the auxiliary system 306. In some examples, the cloud infrastructure performs the identification by comparing the device firmware details in the firmware update package generation instructions 312 with the latest device firmware details in the firmware information repository.

In response to the comparison, the cloud infrastructure identifies one or more firmware updates for the first core system 304 and the auxiliary system 306. The cloud infrastructure maintains a firmware update repository that comprises firmware updates for the first core system 304 and the auxiliary system 306. In some examples, the cloud infrastructure 112 identifies one or more firmware updates for the first core system 304 and the auxiliary system 306 from the firmware update repository.

The cloud infrastructure 314 generates a firmware update package 316 comprising one or more firmware updates for the first core system 304 and the auxiliary system 306. The cloud infrastructure 314 extracts the firmware updates for the first core system 304 and the auxiliary system 306 from the firmware update repository. The firmware update repository may include firmware updates for a number of systems (not illustrated) including firmware updates for the first core system 304 and the auxiliary system 306. The cloud infrastructure 314 may extract the firmware updates relevant to the first core system 304 and the auxiliary system 306.

After the firmware update package is created, the cloud infrastructure 314 sends an update message 322 informing the generation of the firmware update package 316 to the first core system 304. In some examples, the update message is a status message (e.g., a Transmission Control Protocol (TCP) or an Internet Protocol (IP) message) that is sent to the first core system 304.

In response to receiving the update message, the first core system 304, downloads the firmware update package 316 from the cloud infrastructure 314. In some examples, the first core system 304 communicates with the cloud infrastructure (including receiving the update message and downloading the firmware update package) 112 via an authentication mechanism, for example, a mutual authentication mechanism such as certificates-based on mTLS.

In some examples, the first core system 304 updates its firmware, based on the firmware updates in the firmware update package 316. The first core system 304 identifies its firmware updates from the firmware update package 316, based on a device identifier. Consequent to such identification, the first core system 304 extracts the relevant firmware updates and updates its firmware.

In some examples, the first core system 304 receives a request 318 for a specific firmware update(s) from the auxiliary system 306. In some examples, the first core system 304 receives the request 318 via an authentication mechanism, for example, a mutual authentication mechanism such as certificates based on mTLS.

In response, based on the request received from the auxiliary system 306, the first core system 304, identifies the specific firmware update(s) for the auxiliary system 306 from the firmware update package 316, based on a device identifier. Consequent to such identification, the first core system 304 extracts the specific firmware update(s) from the firmware update package 316. The firmware update package 316 may include firmware updates for a number of auxiliary systems including firmware updates for the auxiliary system 306. The first core system 304 extracts the firmware updates of the auxiliary system 306 from the firmware update package 316 based on the request received from the auxiliary system 306.

The first core system 304 then provides the specific firmware update(s) 320 to the auxiliary system 306. In some examples, the first core system 304 provides the specific firmware update(s) via an authentication mechanism, for example, a mutual authentication mechanism such as certificates based on mTLS.

Figure 4:
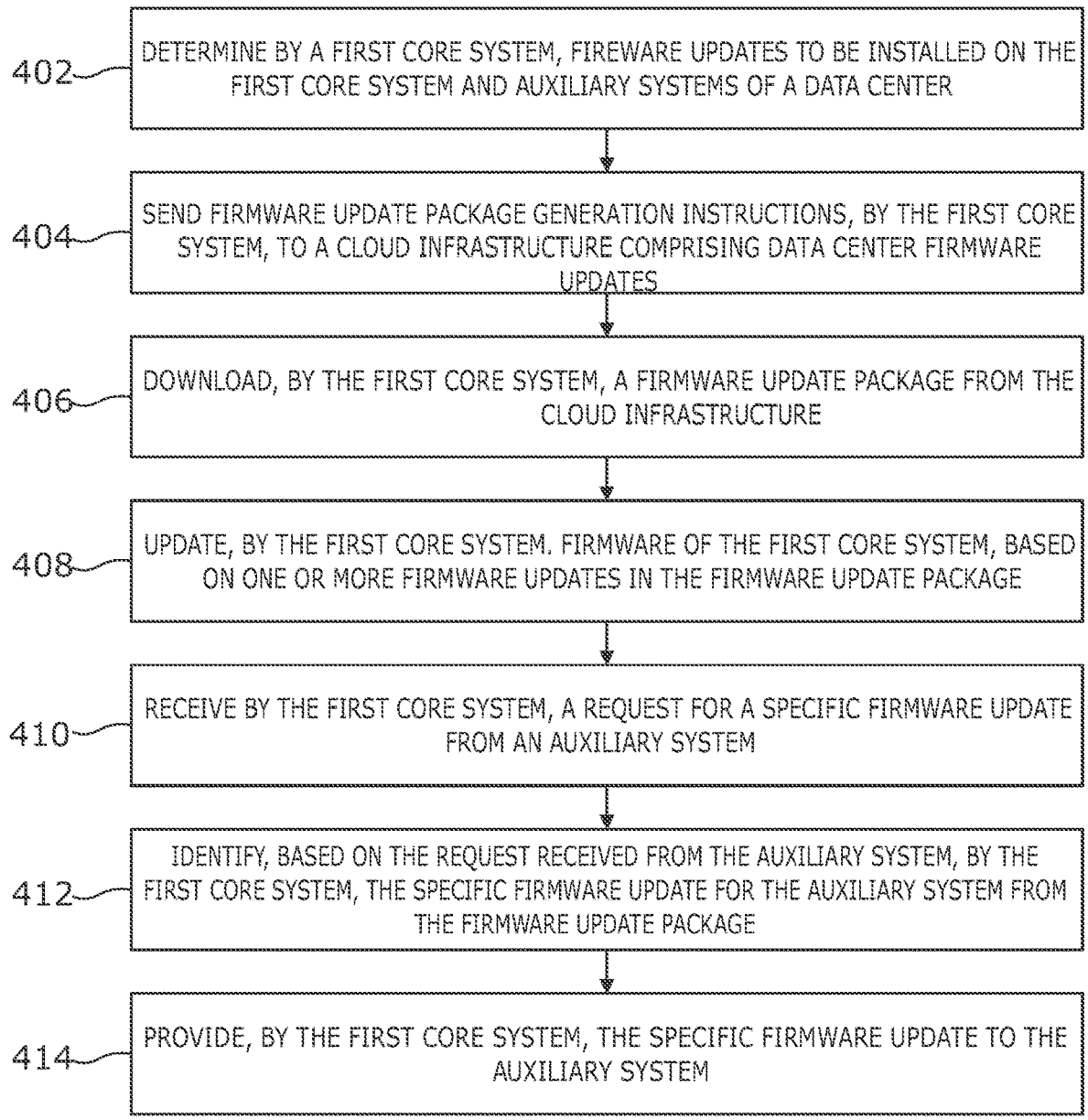
FIG. 4 is a flowchart of a method for updating firmware in a data center, according to some examples.

FIG. 4 is a flowchart of method 400, according to some examples. Method 400 can be performed by a system including a processor, where the system can include a computer or multiple computers. For example, method 400 can at least partially be executed on the first core system 102 or an auxiliary system (e.g., 104, 106, 108, or 110) of FIG. 1.

At block 402, method 400 includes determining, by a first core system, firmware updates to be installed on the first core system and the auxiliary systems of a data center. In some examples, the first core system sends a communication message requesting device firmware details to the auxiliary systems. In response to the communication message, the first core system may receive a response message including device firmware details from the respective auxiliary system.

The first core system identifies its device firmware details and collates those details with the device firmware details received from the auxiliary systems. In some examples, the first core system identifies the device firmware details by generating a report of the current version of firmware installed on the first core system. Each auxiliary system generates a similar report as well, which is provided to the first core system. The first core system collates details from both reports.

The first core system compiles the collated firmware details into firmware update package generation instructions. The first core system compiles the collated firmware details into firmware update package generation instructions. In some examples, the first core system complies the collated firmware details by consolidating the individual reports into a single report that includes an inventory list of firmware on the first core system and the auxiliary systems.

At block 404, method 400 includes sending firmware update package generation instructions, by the first core system, to a cloud infrastructure comprising data center firmware updates wherein the firmware package generation instructions include current firmware details of the firmware on the first core system and the auxiliary systems along with instructions to identify one or more firmware updates for the first core system and the auxiliary systems.

At block 406, method 400 includes downloading, by the first core system, a firmware update package from the cloud infrastructure. The cloud infrastructure maintains a firmware information repository that comprises the latest device firmware details of the first core system and the auxiliary systems. In some examples, the cloud infrastructure performs the identification by comparing the device firmware details in the firmware update package generation instructions with the latest device firmware details in the firmware information repository.

At block 408, method 400 includes updating, by the first core system, the firmware of the first core system, based on one or more firmware updates in the firmware update package. The first core system identifies its firmware updates from the firmware update package, based on a device identifier. Consequent to such identification, the first core system extracts the relevant firmware updates and updates its firmware.

At block 410, method 400 includes receiving, by the first core system, a request for a specific firmware update from an auxiliary system. The request may include, for example, a device identifier of the auxiliary system along with details related to the firmware or hardware whose update is requested. The device identifier is used to identify the auxiliary system. The details related to the firmware or hardware (for example, processor, graphics processor, hard drive, mouse, or any other device) may include firmware version, firmware build number, or other related details. In some examples, the first core system receives the request via an authentication mechanism, for example, a mutual authentication mechanism such as certificates based on mTLS.

At block 412, method 400 includes identifying, by the first core system, the specific firmware update for the auxiliary system from the firmware update package, based on the request received from the auxiliary system. Consequent to such identification, the first core system extracts the specific firmware update(s) from the firmware update package. The firmware update package may include firmware updates for a number of auxiliary systems including firmware updates for the auxiliary system. The first core system extracts the firmware updates from the firmware update package based on the request received from the auxiliary system At block 414, method 400 includes providing, by the first core system, the specific firmware update to the auxiliary system. In some examples, the first core system 304 provides the specific firmware update(s) via a mutual authentication mechanism, for example, certificates based on mTLS. The first core system can decide the time of sending the specific firmware update to the auxiliary system, for example, based on rules set on the first core system. The first core system can also give a prior intimation regarding the time of sending the specific firmware update to the auxiliary system.

Figure 5:
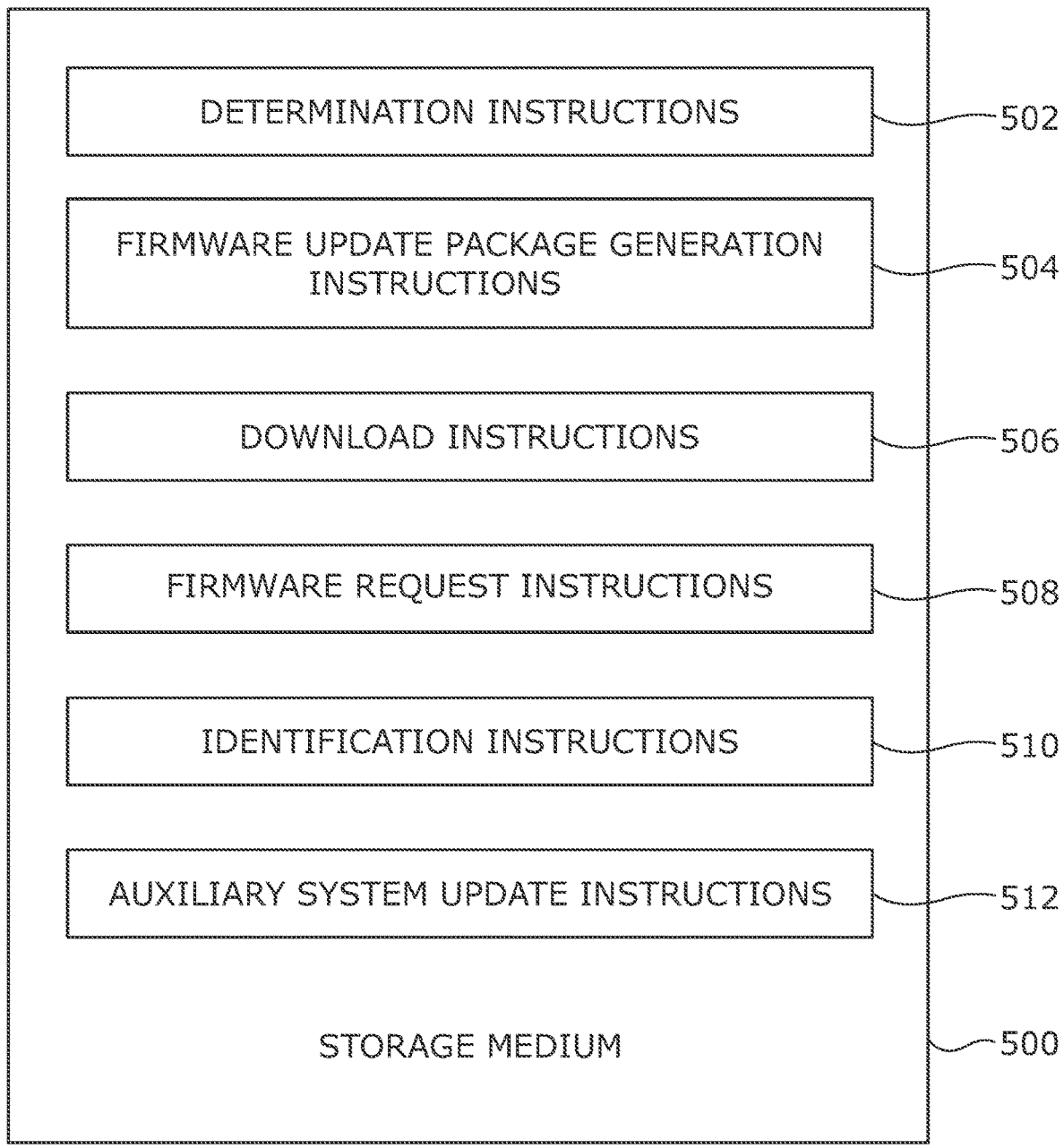
FIG. 5 is a block diagram of a storage medium storing machine-readable instructions for updating firmware in a data center, according to some examples.

FIG. 5 is a block diagram of a non-transitory machine-readable or computer-readable storage medium 500 storing machine-readable instructions that upon execution cause a system to perform various tasks. The system can include a computer or a collection of computers.

The machine-readable instructions include determination instructions 502 to determine firmware updates to be installed on a first core system and auxiliary systems of a data center).

The machine-readable instructions include firmware update package generation instructions 504 to a cloud infrastructure comprising data center firmware updates.

The machine-readable instructions include download instructions 506 to download a firmware update package from the cloud infrastructure.

The machine-readable instructions include firmware request instructions 508 to receive a request for a specific firmware update from an auxiliary system of the data center.

The machine-readable instructions include identification instructions 510 to identify, based on the request received from the auxiliary system, the specific firmware update for the auxiliary system from the firmware update package.

The machine-readable instructions include auxiliary system update instructions 512 to provide the specific firmware update to the auxiliary system.

In some examples, the machine-readable instructions include core system update instructions to update the firmware of the core system, based on one or more firmware updates in the firmware update package.

Instructions contained in storage medium 500 are as explained in reference to the description of earlier figures (e.g., 1, 2, 3, or 4).

For simplicity of explanation, the example method of FIG. 4 is shown as executing serially, however, it is to be understood and appreciated that the present and other examples are not limited by the illustrated order. The example systems of FIGS. 1, 2, 3, and 5, and the method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general-purpose or special-purpose computer. The computer-readable instructions can also be accessed from memory and executed by a processor.

It should be understood that the above-described examples of the present solution are for illustration only. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:
1. A method comprising:
   determining, by a first core system, firmware updates to be installed on the first core system and auxiliary systems;

sending, by the first core system, firmware update package generation instructions over a network to an infrastructure comprising firmware updates;

receiving, by the first core system, a firmware update package from the infrastructure;

updating, by the first core system, firmware of the first core system based on one or more firmware updates in the firmware update package;

executing, by the first core system, the updated firmware to perform target functionalities;

receiving, by the first core system, a request for a specific firmware update from an auxiliary system of the auxiliary systems;

identifying, by the first core system and based on the request received from the auxiliary system of the auxiliary systems, the specific firmware update from the firmware update package;

providing, by the first core system, the specific firmware update to the auxiliary system of the auxiliary systems;

selecting, by the first core system, a first auxiliary system of the auxiliary systems as a backup core system for the first core system based on metrics of the auxiliary systems, wherein the selecting of the first auxiliary system of the auxiliary systems as the backup core system for the first core system comprises:

determining one or more of:
a number of pending firmware updates on each respective auxiliary system of the auxiliary systems,
available storage spaces of the auxiliary systems, or
prior firmware download success rates of the auxiliary systems from the infrastructure; and promoting the first auxiliary system of the auxiliary systems as the backup core system for the first core system based on one or more of:
a number of pending firmware updates on the first auxiliary system of the auxiliary systems,
an available storage space on the first auxiliary system of the auxiliary systems being more than a pre-defined storage space value, or
a prior firmware download success rate of the first auxiliary system of the auxiliary systems being higher than a pre-defined firmware download success rate value;

downloading, by the backup core system, firmware updates for the auxiliary systems in an event of unavailability of the first core system;

providing, by the backup core system, the downloaded firmware updates to the auxiliary systems;

updating, by the auxiliary systems, firmware of the auxiliary systems; and executing, by the auxiliary systems, the updated firmware of the auxiliary systems to perform target functionalities.

2. The method of claim 1, wherein the determining of the firmware updates to be installed on the first core system and the auxiliary systems is in response to an addition of a new auxiliary system.

3. The method of claim 2, wherein the new auxiliary system comprises a computer with at least one of new hardware, new software, or new firmware.

4. The method of claim 1, further comprising:
detecting the unavailability of the first core system; and
based on detecting the unavailability of the first core system, downloading, by the backup core system, a firmware update package comprising the firmware updates for the auxiliary systems from the infrastructure.

5. The method of claim 1, wherein the selecting of the first auxiliary system of the auxiliary systems as the backup core system for the first core system comprises:
determining network bandwidth consumptions of respective lights out cards on the auxiliary systems; and
promoting the first auxiliary system of the auxiliary systems as the backup core system for the first core system further based on a lights out card of the first auxiliary system of the auxiliary systems having a network bandwidth consumption lower than a pre-defined network bandwidth consumption value.

6. The method of claim 5, wherein the lights out card of each respective auxiliary system of the auxiliary systems has a network connection that is separate from a network connection of the respective auxiliary system of the auxiliary systems.

7. The method of claim 1, wherein the determining of the firmware updates to be installed on the auxiliary systems comprises:
sending, by the first core system, a message requesting device firmware details to the auxiliary systems; and
receiving, by the first core system, a response message including device firmware details from each auxiliary system of the auxiliary systems.

8. The method of claim 1, wherein the auxiliary system of the auxiliary systems comprises a computer with no direct uplink to the infrastructure.

9. A system comprising:
a first core system; and
auxiliary systems, the first core system comprising a processor to:
determine firmware updates to be installed on the first core system and the auxiliary systems;
send firmware update package generation instructions over a network to an infrastructure comprising firmware updates;
receive a firmware update package from the infrastructure at the first core system;
update firmware of the first core system based on one or more firmware updates in the firmware update package;
execute, at the first core system, the updated firmware to perform target functionalities;
receive a request for a specific firmware update from an auxiliary system of the auxiliary systems;
identify, based on the request received from the auxiliary system of the auxiliary systems, the specific firmware update from the firmware update package;
provide the specific firmware update to the auxiliary system of the auxiliary systems; and
select a first auxiliary system of the auxiliary systems as a backup core system for the first core system based on metrics of the auxiliary systems, wherein the selecting of the first auxiliary system of the auxiliary systems as the backup core system for the first core system comprises:
determining one or more of:
a number of pending firmware updates on each respective auxiliary system of the auxiliary systems,
available storage spaces of the auxiliary systems, or
prior firmware download success rates of the auxiliary systems from the infrastructure; and promoting the first auxiliary system of the auxiliary systems as the backup core system for the first core system based on one or more of:
- a number of pending firmware updates on the first auxiliary system of the auxiliary systems,
- an available storage space on the first auxiliary system of the auxiliary systems being more than a pre-defined storage space value, or
- a prior firmware download success rate of the first auxiliary system of the auxiliary systems being higher than a pre-defined firmware download success rate value;

the backup core system to:
- download firmware updates for the auxiliary systems in an event of unavailability of the first core system; and
- provide the downloaded firmware updates to the auxiliary systems; and the auxiliary systems to:
- update firmware of the auxiliary systems; and
- execute, at the auxiliary systems, the updated firmware of the auxiliary systems to perform target functionalities.

10. The system of claim 9, wherein the first core system further comprises a Baseboard Management Controller (BMC), and wherein the processor of the first core system is part of the BMC.

11. The system of claim 9, wherein the processor of the first core system is to further:
- determine network bandwidth consumptions of respective lights out cards on the auxiliary systems; and
- promote the first auxiliary system of the auxiliary systems as the backup core system for the first core system further based on a lights out card of the first auxiliary system of the auxiliary systems having a network bandwidth consumption lower than a pre-defined network bandwidth consumption value.

12. The system of claim 11, wherein the lights out card of each respective auxiliary system of the auxiliary systems has a network connection that is separate from a network connection of the respective auxiliary system of the auxiliary systems.

13. A non-transitory machine-readable storage medium storing instructions that upon execution cause a system comprising a first core system and auxiliary systems to:
- determine, by the first core system, firmware updates to be installed on the first core system and the auxiliary systems;
- send, by the first core system, firmware update package generation instructions over a network to an infrastructure comprising firmware updates;
- receive, by the first core system, a firmware update package from the infrastructure;
- update, by the first core system, firmware of the first core system based on one or more firmware updates in the firmware update package;
- execute, by the first core system, the updated firmware to perform target functionalities;
- receive, by the first core system, a request for a specific firmware update from an auxiliary system of the auxiliary systems;
- identify, by the first core system and based on the request received from the auxiliary system of the auxiliary systems, the specific firmware update from the firmware update package;
- provide, by the first core system, the specific firmware update to the auxiliary system of the auxiliary systems;
- select, by the first core system, a first auxiliary system of the auxiliary systems as a backup core system for the first core system based on metrics of the auxiliary systems, wherein the selecting of the first auxiliary system of the auxiliary systems as the backup core system for the first core system comprises:
  - determining network bandwidth consumptions of respective lights out cards on the auxiliary systems; and
  - promoting the first auxiliary system of the auxiliary systems as the backup core system for the first core system based on a lights out card of the first auxiliary system of the auxiliary systems having a network bandwidth consumption lower than a pre-defined network bandwidth consumption value;
- download, by the backup core system, firmware updates for the auxiliary systems in an event of unavailability of the first core system;
- provide, by the backup core system, the downloaded firmware updates to the auxiliary systems;
- update, by the auxiliary systems, firmware of the auxiliary systems; and
- execute, by the auxiliary systems, the updated firmware of the auxiliary systems to perform target functionalities.

14. The non-transitory machine-readable storage medium of claim 13, wherein the instructions upon execution further cause the system to:
- determine, by the first core system, a number of pending firmware updates on each respective auxiliary system of the auxiliary systems; and
- promote, by the first core system, the first auxiliary system of the auxiliary systems as the backup core system for the first core system further based on a number of pending firmware updates on the first auxiliary system of the auxiliary systems.

15. The non-transitory machine-readable storage medium of claim 13, wherein the instructions upon execution further cause the system to:
- determine, by the first core system, prior firmware download success rates of the auxiliary systems from the infrastructure; and
- promote, by the first core system, the first auxiliary system of the auxiliary systems as the backup core system for the first core system further based on a prior firmware download success rate of the first auxiliary system of the auxiliary systems being higher than a pre-defined firmware download success rate value.

* * * * *